US012623563B2

(12) United States Patent
Gauer et al.

(10) Patent No.: US 12,623,563 B2
(45) Date of Patent: May 12, 2026

(54) METHOD FOR SIGNALING AN END OF THE CHARGING OF A CHARGING PROCESS, OUTPUT DEVICE, MOTOR VEHICLE AND CHARGING DEVICE

(71) Applicant: AUDI AG, Ingolstadt (DE)

(72) Inventors: Leonie Gauer, Ingolstadt (DE); Ingo Totzke, Ingolstadt (DE); Christoph Weigand, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 353 days.

(21) Appl. No.: 17/488,089

(22) Filed: Sep. 28, 2021

(65) Prior Publication Data

US 2022/0097542 A1 Mar. 31, 2022

(30) Foreign Application Priority Data

Sep. 30, 2020 (DE) .......................... 102020125495.4

(51) Int. Cl.
*B60L 53/30* (2019.01)
*B60L 53/14* (2019.01)
*B60L 53/62* (2019.01)

(52) U.S. Cl.
CPC ............. B60L 53/305 (2019.02); B60L 53/14 (2019.02); B60L 53/62 (2019.02)

(58) Field of Classification Search
CPC ......... B60L 53/305; B60L 53/62; B60L 53/14
See application file for complete search history.

(56) References Cited

U.S. PATENT DOCUMENTS

| | | | | |
|---|---|---|---|---|
| 10,348,038 B2 * | 7/2019 | Ognjanovski | ...... | H01R 13/6683 |
| 2013/0338824 A1 * | 12/2013 | Becker | .................. | G07F 15/005 |
| | | | | 700/237 |
| 2017/0297443 A1 * | 10/2017 | You | .................... | H01R 13/6395 |

(Continued)

FOREIGN PATENT DOCUMENTS

| | | | |
|---|---|---|---|
| DE | 102010052376 A | * | 11/2010 |
| DE | 102011010809 A1 | | 8/2012 |

(Continued)

OTHER PUBLICATIONS

MT of DE102010052376 (Year: 2010).*

(Continued)

*Primary Examiner* — Navid Z. Mehdizadeh
*Assistant Examiner* — Oliver Tan
(74) *Attorney, Agent, or Firm* — Seed Intellectual Property Law Group LLP

(57) ABSTRACT

A method for signaling an end of charging of a charging process for charging an energy accumulator of a first motor vehicle, which is associated with a first user, at a charging device external to the vehicle, includes detecting an end of charging for the energy accumulator of the first motor vehicle, connected by a coupling to the charging device during the charging, and signaling the end of the charging at least under the condition that the end of the charging has been detected. Furthermore, the signaling involves the end of the charging being signaled to at least one second user, different from the first user, regardless of whether a separating of the coupling of the first motor vehicle to the charging device has been authorized by the first user, after the detecting of the end of the charging.

16 Claims, 2 Drawing Sheets

(56)                    References Cited

U.S. PATENT DOCUMENTS

2018/0202825 A1      7/2018  You et al.
2019/0210468 A1*     7/2019  Wittl ................... H02J 7/00714
2020/0094703 A1*     3/2020  Ohtomo ................. B60L 53/62
2022/0231455 A1*     7/2022  Thiel ................... H01R 13/622

FOREIGN PATENT DOCUMENTS

DE       102017222514 A1 *   6/2019
DE       102018207219 A1     7/2019
DE       102018111593 A1    11/2019
DE       102018219974 A1 *   5/2020
JP         2011254643 A  *  12/2011
WO         2010/096502 A1     8/2010
WO         2014/074425 A2     5/2014
WO      WO-2019149992 A1 *   8/2019   .............. B60L 53/65

OTHER PUBLICATIONS

JP-2011254643-A machine translation, description Espacenet.*
DE102018219974A1 machine translation (Year: 2020).*
DE102017222514A1 machine translation.*

* cited by examiner

METHOD FOR SIGNALING AN END OF THE CHARGING OF A CHARGING PROCESS, OUTPUT DEVICE, MOTOR VEHICLE AND CHARGING DEVICE

BACKGROUND

Technical Field

Embodiments of the invention relate to a method for signaling an end of charging of a charging process for charging an energy accumulator of a motor vehicle, which is associated with a first user, at a charging device external to the vehicle. An end of charging of the energy accumulator of the first motor vehicle connected by a coupling to the charging device during the charging is detected and the end of the charging is signaled at least under the condition that the end of the charging has been detected. Embodiments of the invention moreover relate to a corresponding output device for signaling an end of the charging, a motor vehicle having such an output device, and a charging device, especially a charging column, having such an output device.

Description of the Related Art

As is known, electric vehicles such as purely battery-operated electric vehicles and/or plug-in hybrid vehicles need to be charged in order to remain drivable. Since the ranges in the most favorable case are around 250 to 500 kilometers, depending on the battery capacity, for lengthier trips it is often necessary to charge the vehicle at charging devices, such as public charging columns. Often a charging column is available having a charging cable and a charging plug arranged on it for at least two parking places. The vehicle being charged occupies a parking place and the corresponding charging cable for the duration of the charging process and possibly even beyond. Usually the charging cable is firmly connected to the charging station and the charging plug is locked to the vehicle with the vehicle being locked and the charging process taking place. This ensures that the charging process cannot be ended in unauthorized manner. Only when the driver of the motor vehicle unlocks their vehicle once again does this also trigger an unlocking of the charging plug.

Since the charging phase especially at public charging stations is often utilized by vehicle drivers for a lengthy stay and the particular vehicle driver is not present in the vicinity of their motor vehicle during the entire charging process, lengthy occupancy times may result, during which the charging station cannot be further used, even though the vehicle is already fully charged. Only when the vehicle driver returns to their vehicle and unlocks the charging plug by opening their motor vehicle is the charging column again available for other users. In order to avoid excessively long occupancy times despite a fully charged battery, the operators of the charging columns often impose penalties on the passive occupation of the charging column with additional fees—albeit to the annoyance of the vehicle drivers.

Furthermore, it is known in the prior art that the end of the charging can be signaled to a vehicle driver, for example by informing them via their mobile telephone as to the current charging status or the end of the charging. In this regard, WO 2010/096502 A1 describes a communication and information method which is carried out by a network server of a charging station for electric vehicles. Users who have logged in and registered on this server or for this service can be informed about various events. The user themselves can determine which events to be informed about. Such events may be, for example, the end of the charging process, the current charging status, or the like. The information about such an event can be put out to a user for example on their mobile communication device. In this way, a user can also be notified as to the end of the charging process even when they are not located in the vicinity of the motor vehicle.

But if the user is busy at the moment or finds themselves at a great distance from their motor vehicle, it may still take a long time before the charging column is again available for the charging of other vehicles.

Furthermore, US 2018/0202825 A1 describes a method for providing availability information of charging stations to motor vehicles. This availability information should also include certain forecasts which can be created for example on the basis of a charging history of other vehicles or the current charging status of other vehicles in the vicinity. Basically, it also discloses the possibility of communicating the present occupation status of a charging station to other motor vehicles, and also for example the remaining time to charge other motor vehicles, or the like. But not even these measures solve the problems mentioned above.

BRIEF SUMMARY

Embodiments described herein provide a method, an output device, a motor vehicle and a charging device making it possible to avoid or lessen as much as possible the needless waiting time at charging devices.

In a method for signaling an end of charging of a charging process for charging an energy accumulator of a first motor vehicle, which is associated with a first user, at a charging device external to the vehicle, an end of the charging is detected for the energy accumulator of the first motor vehicle, connected by a coupling to the charging device during the charging, and the end of the charging is signaled at least under the condition that the end of the charging has been detected. The signaling involves the end of the charging being signaled to at least one second user, different from the first user, regardless of whether a separating of the coupling of the first motor vehicle to the charging device has been authorized by the first user after the detecting of the end of the charging.

This makes it possible, for other users, such as the second user, to utilize the charging device for charging another motor vehicle, even if the first user of the first motor vehicle is not even present, at least so long as the charging process for charging the energy accumulator of the first motor vehicle has ended. The signaling now makes other potential users of the charging device aware that the end of the charging has been reached and that these other users can now make use of the charging device without the first user needing to be present and having to authorize the unlocking of their first motor vehicle from the charging device after the detecting of the end of the charging. Thus, needless waiting for charging devices on account of the fact that motor vehicles whose energy accumulators are already fully charged are still blocking the particular charging device, such as a charging column, until the particular user uncouples their vehicle from the charging device, is avoided. Furthermore, penalties for vehicle drivers who remain away from their vehicle for a significantly longer time than the actual charging time for their vehicle no longer need to be imposed. Thus, the charging process itself can also be organized in a much more comfortable manner, since now the free time available during the charging process can be utilized without restrictions, in particular also beyond the length of time of the charging process. In other words, vehicle drivers can for example take a long walk during the charging, visit recreational facilities, get something to eat, and so forth, without having to worry about being back at their vehicle in good time by the end of the charging.

The end of the charging process for charging the energy accumulator may be defined, for example, in that the energy accumulator has been charged in a predetermined manner. This, in turn, can mean that the energy accumulator has been charged up to a charging status which can be determined by the first user, for example, it has been fully charged, or also only up to a predetermined charging status, different from a full charging. For example, it may also be provided that the first user, as well as users in general of a particular charging device, such as a charging column, can predetermine the charging status up to which the energy accumulator of their motor vehicle should be charged by the charging process and/or how long the charging process should take at most and/or how much the charging should cost in total, or the like. If such a predetermined criterion is then fulfilled at least, this can define the end of the charging.

The energy accumulator may represent a battery, especially a high-voltage battery of the first motor vehicle. The first motor vehicle may accordingly be an electric vehicle, such as a purely battery-operated vehicle or a plug-in hybrid vehicle. The charging will accordingly then involve primarily an electric charging. Furthermore, a charging device external to the vehicle can mean for example a charging column. In particular, this charging device external to the vehicle should mean a public charging device or at least a semi-public charging device. Semi-public charging devices are, for example, charging devices which may be privately owned by individual persons, who make their charging devices available to the public at least temporarily. A charging column in the context of the present disclosure will also mean, in particular, a charging device not having a columnar shape.

The coupling by which the first motor vehicle is connected to the charging device during the charging process may be provided, for example, by a charging cable with a charging plug. This charging cable with the charging plug may be associated with the charging device, for example, that is, it may be comprised by it. Such a charging cable may then be coupled by the charging plug located on it with a corresponding socket on the motor vehicle. Basically, however, the possibility also exists for such a charging cable to be carried along by the motor vehicle itself and to be coupled on one hand with the corresponding charging device on the motor vehicle and on the other hand with the charging device for the charging.

The fact that the signaling of the end of the charging occurs regardless of whether a separating of the coupling of the first motor vehicle to the charging device was authorized by the first user after detecting the end of the charging does not necessarily mean that there is no authorization at all by the first user. This may also mean that an authorization was already given by the first user prior to detecting the end of the charging, especially the beginning of the charging process. Such an authorization already given may constitute a further second condition. For example, according to another embodiment, it may be provided that the end of the charging is signaled at least under the second condition that an authorization by the first user is done or is present prior to detecting the end of the charging, especially prior to the beginning of the charging process. The same may also apply in particular for the unlocking of the coupling, as described below. Thus, if a user does not want a stranger to remove the charging cable from their motor vehicle, neither do they have to allow this.

In an embodiment, the coupling between the first motor vehicle and the charging device is locked during the charging process and the coupling is automatically unlocked after detecting the end of the charging, at least regardless of whether a separating of the coupling of the first motor vehicle to the charging device has been authorized by the first user after the detecting of the end of the charging. Because of the fact that the coupling between the first motor vehicle and the charging device is or becomes locked during the charging process, one may also ensure that the charging process cannot be ended without authorization by another user. Even so, other users may still use the charging device immediately after the ending of the charging process, since the coupling is automatically unlocked without the first user needing to be present for this or having to authorize this in some way after detecting the end of the charging. In other words, a second user after the ending of the charging process at the first motor vehicle can simply pull out the charging plug and use it for charging their own motor vehicle. As already mentioned, it may also hold here that an authorization by the first user must be given as an option, in order to automatically unlock the coupling. This authorization may then have been given by the first user prior to detecting the end of the charging, especially prior to the beginning of the charging process or even earlier. In other words, it may be provided that an automatic unlocking of the coupling will only occur when an authorization by the first user is given or has been given prior to detecting the end of the charging, especially prior to the beginning of the charging process.

An automatic unlocking can mean, in particular, an unlocking which occurs without any interaction by a user. Thus, the coupling is unlocked without any action of the user being needed or taking place between the detecting of the end of the charging and the unlocking. In particular, such an unlocking may occur at once automatically after the detecting of the end of the charging. At once means that the detecting of the end of the charging triggers the unlocking or triggers the sending of an unlocking signal. This signal, in turn, may be sent from a control device of the motor vehicle to the charging device of the motor vehicle, which in turn triggers the unlocking. The locking of the coupling will be a mechanical locking, in particular. For example, an automatic unlocking of a charging plug of the charging device inserted at the first motor vehicle may occur at once after detecting the end of the charging.

Now, since it does not appear obvious to many people, at least initially, that a charging plug inserted in a stranger's vehicle can simply be pulled out and used for charging their own motor vehicle, this may be signaled explicitly. With such a signaling it is possible not only to inform other users, such as the second user in this case, that the end of the charging has been reached, but also that it is possible or even desirable to separate the coupling between the first motor vehicle and the charging device. In other words, the signaling can put out information which explicitly shows that a pulling out of the charging plug from the stranger's vehicle is permitted.

In another embodiment, the signaling involves putting out information regarding the end of the charging with a locally limited range. In other words, the information as to the end of the charging is not put out or not only put out by means of a long-range data transmission, or not put out or not only put out with a wireless data transmission to a particular terminal device of a user, but rather it is put out locally, for example, by an output device in the immediate vicinity of the charging device, so that this information is also visible only to the users located near the charging device. In other words, the signaling is addressed to the users at the scene. These users at the scene will see, for example, that the charging plug is still inserted at the first motor vehicle, even though the charging process itself has already ended. Such users can now be informed that they are allowed to remove the charging plug by themselves and use it for charging their own motor vehicle.

In another embodiment, the signaling involves a public outputting of information regarding the end of the charging. In other words, this means that there is no personalized or addressed outputting or signaling, but rather the information that the end of the charging has been reached and especially also that the coupling of the first motor vehicle to the charging device can now be separated is put out to the public, in particular, to all who are situated in the immediate vicinity of the charging device. Thus, neither is it necessary to keep any addresses, telephone numbers, or other personalized data here, in order to inform the respective persons as to the end of the charging. Neither is it necessary for the respective persons or users, such as the second user in the present case, to log into any service in order to be informed. Hence, the method is especially easy and efficient in its design, and also in particular comfortable for every user.

Furthermore, an optical and/or acoustical output may be given when signaling information regarding the end of the charging by an output device, especially a device of the first motor vehicle and/or a device of the charging device. Thus, such information can be put out in words, for example, as a display on a display device and/or also acoustically through one or more loudspeakers. But the information can also be put out symbolically, especially also in optical and/or acoustical form, for example in the form of a colored or optionally also blinking light, and/or also only in the form of a signal tone or the like. For example, a corresponding lighting fixture or lamp on the vehicle and/or at the charging device can light up red as long as the first motor vehicle is being charged, and green once the charging process has ended. The lighting fixture may also not light up as long as the charging process is running, and then start to light up or blink, for example, once the charging process or the charging of the first energy accumulator is ended.

The respective information may be put out by a corresponding text on a display device, such as a display, particularly in a starting or habituation phase for the implementing of this method, in which it may still appear unusual to people to pull out a charging plug from a stranger's motor vehicle without its user being present. In this case, other users can be clearly instructed in text form that the pulling out of the charging plug is permitted. Furthermore, the output device with the display device, especially the display, can also be used during the ongoing charging process to indicate status information, such as the remaining charging time, the current charging status, or the like.

On the other hand, the symbolic outputting of the information, for example in the form of a shining or blinking light, has the advantage that such an information output can be seen for significantly further distances, while at the same time the design of the output device is especially simple. Thus, for example, it can be signaled to users who are even further away, for example those just driving up to the charging device, that the charging device is now free and no longer occupied by the still present first motor vehicle, even though the charging plug is also still inserted.

These information output possibilities can also be combined with each other, of course. For example, a display may be provided on the motor vehicle as the output device, which after detecting the end of the charging explicitly puts out in words the information regarding the end of the charging and also indicates in words, for example, that the charging plug can be removed. At the same time, the particular charging device may likewise have an output device, for example one in the form of a lamp, which begins to shine or blink or change color or generally alter the appearance of its luminous output upon detecting the end of the charging.

Furthermore, the signaling may involve a continual outputting of information regarding the end of the charging, and the outputting of the information regarding the end of the charging may be terminated as soon as a separation of the coupling between the charging device and the first motor vehicle is detected and/or as soon as a coupling between the charging device and a second motor vehicle is detected. The second motor vehicle may be a different motor vehicle from the first motor vehicle. Nevertheless, the outputting of the information may also be ended if, for any reason, a repeat coupling occurs between the charging device and the first motor vehicle, for example, if the first motor vehicle was not yet fully charged and the first user desires a further charging.

The continual outputting of the information regarding the end of the charging has the major advantage that this information is not so easily overlooked by other users. Such a continual outputting can be provided, for example, by a permanent displaying on a display device of the motor vehicle and/or the charging device or also by a permanent lighting or also a permanent blinking of a lamp of the motor vehicle and/or the charging device. Thus, as long as this information is being put out, other users may also assume that a charging at the particular charging device is still possible and that it is not already occupied by another motor vehicle. When the coupling between the motor vehicle and the charging device is separated or at latest when the charging device is coupled to the second motor vehicle, the outputting of the information is terminated. For example, it may be provided that, when the information is put out from an output device of the first motor vehicle, this outputting is terminated as soon as the coupling between this first motor vehicle and the charging station is separated. If the charging device has the output device which signals the end of the charging, the outputting of this information regarding the end of the charging may be terminated only when the charging device is coupled to the second motor vehicle, or as soon as this coupling is detected. This has the advantage that the charging device can thus signal that it is free, until such time as it is occupied once more by a motor vehicle, even when the first motor vehicle has long since driven away.

In another embodiment, the signaling may also involve a sending of a second piece of information regarding the end of the charging to a central data processing device, especially an Internet server, for forwarding to at least one terminal device of a third user. In other words, the information as to the end of the charging can also be provided in addition to third-party providers, who can take into account the now available charging station or charging device in their route planning for other vehicle drivers, for example via a corresponding app, i.e., an application program. The terminal device of a third user can then represent their motor vehicle, for example, which can have corresponding communication and output means, as well as a mobile communication device in the form of a smartphone or the like. In this way, even more distant potential users of the charging device can be informed as to its availability.

If the charging plug is uncoupled or in general the coupling between the first motor vehicle and the charging device is separated, there may also occur an immediate blocking of the personalized data of the first user which is normally used for such a charging process. Thanks to this blocking, no accessing of the data of the first user is possible during a further charging process, thus preventing a misuse, such as a charging at the expense of the previous charging party.

Furthermore, some embodiments relate to an output device for signaling an end of the charging of an energy accumulator of a first motor vehicle, which is associated with a first user, at a charging device, wherein the output device is designed to signal the end of the charging in dependence on a detected end of the charging of the energy accumulator. For this, the output device is designed to signal the end of the charging to at least one second user, different from the first user, regardless of whether a separation of a coupling of the first motor vehicle to the charging device has been authorized by the first user after a detection of the end of the charging.

The benefits mentioned for the method described herein and its embodiments apply equally to the output device described herein. Furthermore, the method steps described herein enable a modification of the output device described herein with further corresponding mentioned features.

For example, the output device may be designed with a display having a display surface. This makes possible a signaling by putting out text and/or graphic representations and/or symbols, and so forth. The output device may also comprise, in addition or alternatively to a display, a lamp not configured as a display and lighting up in predetermined manner for the signaling. Yet the output device may also be configured as any other desired output device and it may comprise other output means in addition or alternatively, such as loudspeakers for acoustical outputting of the signal. Furthermore, the output device may also comprise a communication module for communication with a control device, such as a device of the motor vehicle or a device of the charging device. Through such a communication module, the output device may receive, for example, information as to the detected end of the charging. The reception of this information can trigger the outputting of the signal to signal the end of the charging. Accordingly, the communication module can also receive a signal for the terminating of the signaling when the mentioned control device has detected for example an uncoupling of the first motor vehicle from the charging device and/or the coupling of another motor vehicle to the charging device.

Some embodiments also include the control device for the output device. The control device may comprise a data processing device or a processor device, adapted to implement an embodiment of the method described herein. For this, the processor device may comprise at least one microprocessor and/or at least one microcontroller and/or at least one FPGA (Field Programmable Gate Array) and/or at least one DSP (Digital Signal Processor). Furthermore, the processor device may comprise program code which is adapted to carry out the embodiment of the method described herein when executed by the processor device. The program code may be stored in a data storage of the processor device.

Furthermore, some embodiments also include a motor vehicle having an output device as described herein. The benefits described for the output device and the method described herein thus hold equally for the motor vehicle described herein as well.

The motor vehicle described herein may be configured as an automobile, especially a passenger car or truck, or as a minibus or motorcycle.

Furthermore, some embodiments also relate to a charging device, especially a charging column, having an output device as described herein. Here as well, the benefits described for the output device and the method described herein hold equally for the charging device described herein as well. By a charging device is meant here a charging device external to the motor vehicle, to which motor vehicles can be coupled in order to electrically charge the respective energy accumulator of the motor vehicles.

Some embodiments also encompass combinations of the features of the described embodiments, so long as the embodiments have not been described as being mutually exclusive.

BRIEF DESCRIPTION OF THE SEVERAL
VIEWS OF THE DRAWINGS

DETAILED DESCRIPTION

Figures 1, 2, 3:
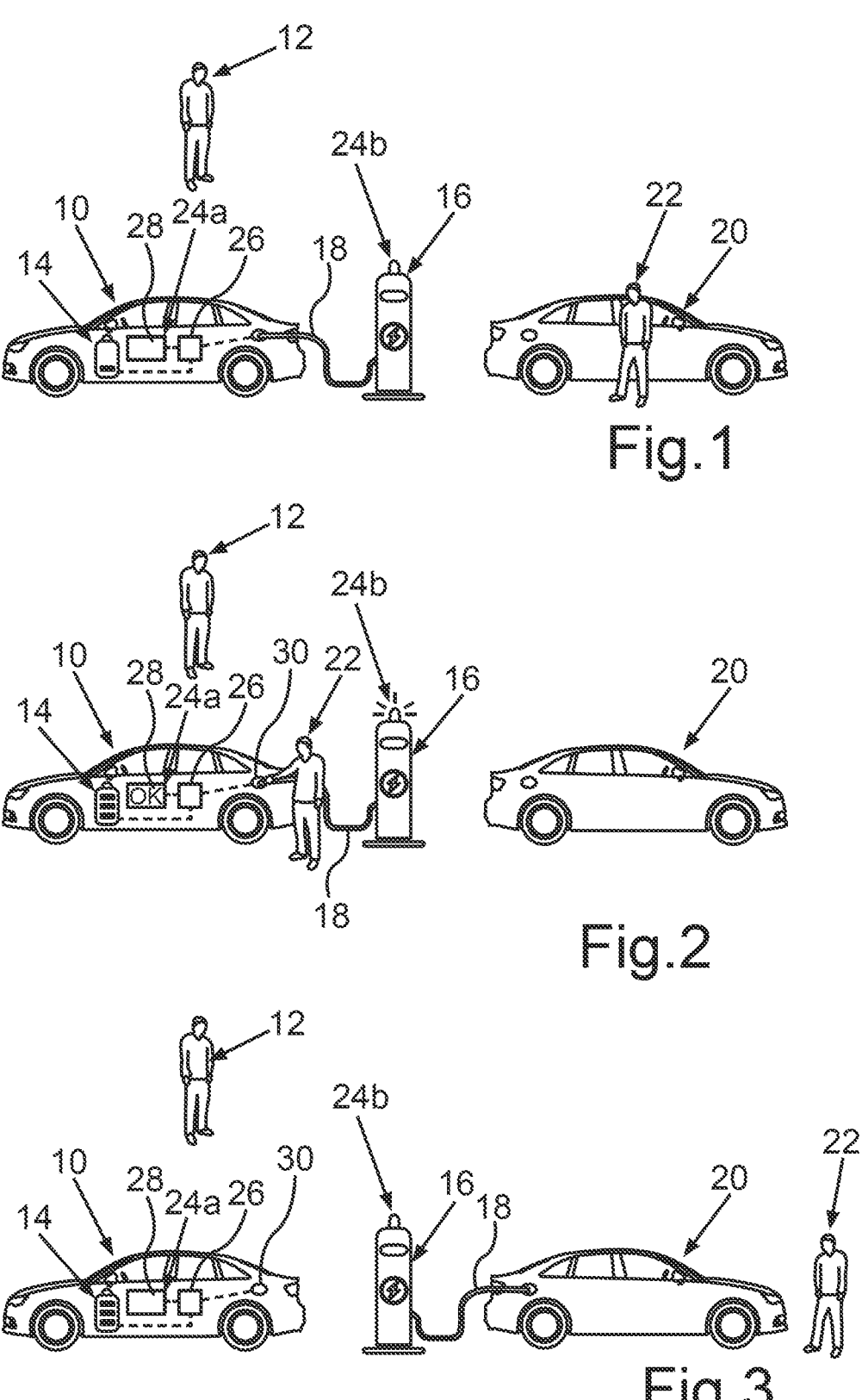
FIG. 1 shows a schematic representation of a first motor vehicle coupled to a charging column during the charging process, as well as a second waiting motor vehicle, to illustrate a method according to an embodiment.
FIG. 2 shows a schematic representation of the two motor vehicles and the charging column of FIG. 1, when the end of the charging has been reached, to illustrate a method according to an embodiment.
FIG. 3 shows a schematic representation of the two motor vehicles and the charging column of FIG. 1 and FIG. 2, where the second motor vehicle has been coupled to the charging column for the charging, to illustrate a method according to an embodiment.

FIG. 1 shows a schematic representation of a first motor vehicle 10, which is associated with a first user 12 and which comprises an energy accumulator 14, especially a high-voltage battery, which in the present situation described is being charged at a charging column 16, especially a public charging column 16. During the charging process, the motor vehicle 10 is connected to the charging column 16 by a charging cable 18, comprising a charging plug for the coupling to a corresponding charging socket 30 of the motor vehicle 10. Furthermore, a second motor vehicle 20 is also represented, being associated with a second user 22. In general, this second motor vehicle 20 may be configured in the same way as the first motor vehicle 10 and also comprise the components which are to be described in the following for the first motor vehicle 10.

In the present example, the second user 22 would also like to charge their motor vehicle 20 at the charging column 16, but it is still occupied at the moment by the first motor vehicle 10. Furthermore, the first user 12 in FIG. 1 is shown for example at a distance from the first motor vehicle 10. Since such charging phases normally last for a relatively long time, the respective users of the particular vehicles typically do not remain at the vehicle, but instead make other use of the free time. It cannot be assured that this first user 12 will again be back at their motor vehicle 10 in good time at the end of the charging to separate the coupling between their motor vehicle 10 and the charging column 16. This has resulted so far in lengthy occupancy times during which the charging point, or the charging column 16 in this example, cannot be further used, even though the particular vehicle is already fully charged. This can now be avoided thanks to the embodiments described herein.

For this purpose, the first motor vehicle 10 and/or the charging column 16 may have an output device 24a, 24b. In this example, both the motor vehicle 10 has an output device 24a and the charging column 16 has an output device designated as 24b. These output devices 24a, 24b may be designed to signal a detected end of the charging process for charging the energy accumulator 14 of the first motor vehicle 10 to the second user 22. Such a signaling will occur in particular regardless of whether a separating of the coupling of the first motor vehicle 10 to the charging device, that is, the charging column 16, has been authorized by the first user 12 upon detecting the end of the charging. By this signaling, the second user 22 can be informed that the charging process at the first motor vehicle 10 has now been ended and the second user 22 may also pull out the charging plug from the first motor vehicle 10, even without the first user 12 being present, and couple it to their motor vehicle 20 in order to now charge it.

This signaling is represented in FIG. 2. As illustrated here schematically, the energy accumulator 14 of the first motor vehicle 10 is now fully charged, which in this example determines the end of the charging. This can be detected, for example, by a control device 26 of the first motor vehicle 10, which in turn relays a corresponding actuating signal to the output device 24a of the motor vehicle 10. Upon receiving this signal, the output device 24a arranges to signal the end of the charging. In this example, the signaling occurs by putting out corresponding information on a display device, especially a display 28, which is arranged on the exterior of the first motor vehicle 10, for example, in the area of the charging socket 30 of the first motor vehicle 10. The charging column 16 in the situation represented in FIG. 2 also puts out a signal through its output device 24b, for example, in the form of a lamp lighting up. This signal output is also triggered by the detecting of the end of the charging. During the charging, especially while the charging column 16 is connected by the charging cable 18 to the first motor vehicle 10, a communication link also exists between the charging column 16 and the first motor vehicle 10, in order to exchange charging-relevant information. The current charging status of the energy accumulator 14 can also be relayed by this communication link to the charging column 16. When the energy accumulator 14 is finally charged in predetermined manner, for example fully charged in the present case, this can be communicated in turn by this communication link from the first motor vehicle 10 to the charging column 16, whereupon this detects the end of the charging and actuates its own output device 24b to signal the end of the charging to the second user 22.

Furthermore, the coupling between the charging column 16 and the motor vehicle 10 may be locked during the charging process. In other words, the inserted charging plug is locked at the motor vehicle 10 and thus cannot be easily removed by an unauthorized person during the charging process. In this way, it can be assured that the charging process cannot be ended in an unauthorized manner. However, if the charging is ended, an automatic unlocking of this locking will occur in this case, which makes it possible for the second user 22 to pull out the charging plug from the first motor vehicle 10 even without the first user 12 being present, as is likewise shown in FIG. 2. It need not necessarily be the case that this pulling out of the charging plug by the second user 22 can occur basically without any kind of authorization by the first user 12. For example, it may be provided that the first user 12 can perform a setting in their motor vehicle 10 prior to the charging process for the charging of the energy accumulator 14, for example, in a corresponding menu of a display and operating device in the motor vehicle 10, whereby the locking of the charging cable can be released automatically and without further interaction by the first user 12 after the end of the charging process. If the first user 12 chooses this setting, they will therefore also be providing their consent, i.e., their authorization for such an automatic unlocking to occur after detecting the end of the charging, even if this first user 12 is not present at this time. After the end of the charging, no authorization by the first user 12 is then needed for pulling out the charging plug or the charging cable 18 from the first motor vehicle 10.

Thus, the second user 22 now recognizes, through the signaling of the end of the charging by means of the output devices 24a, 24b, that they can now charge their own motor vehicle 20 laden and thereupon they insert the charging plug in their motor vehicle 20, as shown in FIG. 3. Needless waiting time can thus be avoided. As soon as the first motor vehicle 10 or its energy accumulator 14 is charged in predetermined manner, the next user can charge their motor vehicle at once, without any delay. With the uncoupling of the charging cable 18 from the first motor vehicle 10 and/or with the inserting of the charging cable 18 at the second motor vehicle 20, the display on the respective output devices 24a, 24b can be ended once more.

Furthermore, it may also be provided that these output devices 24a, 24b do not remain unused even during an ongoing charging process. While they do not signal the end of the charging at this time, they may be used instead to show or otherwise represent a status display of the current charging process. Thus, for example, information can be put out with the display device 24a at the motor vehicle or also with the corresponding output device 24b at the charging column which tells that the motor vehicle 10 is now being charged and/or which indicates the current charging status of the energy accumulator 14 and/or indicates the prior duration of the charging process and/or indicates the remaining duration of the charging process, or the like. Thus, the output device can be used in a dual respect, which makes it all the more efficient.

Figure 4:
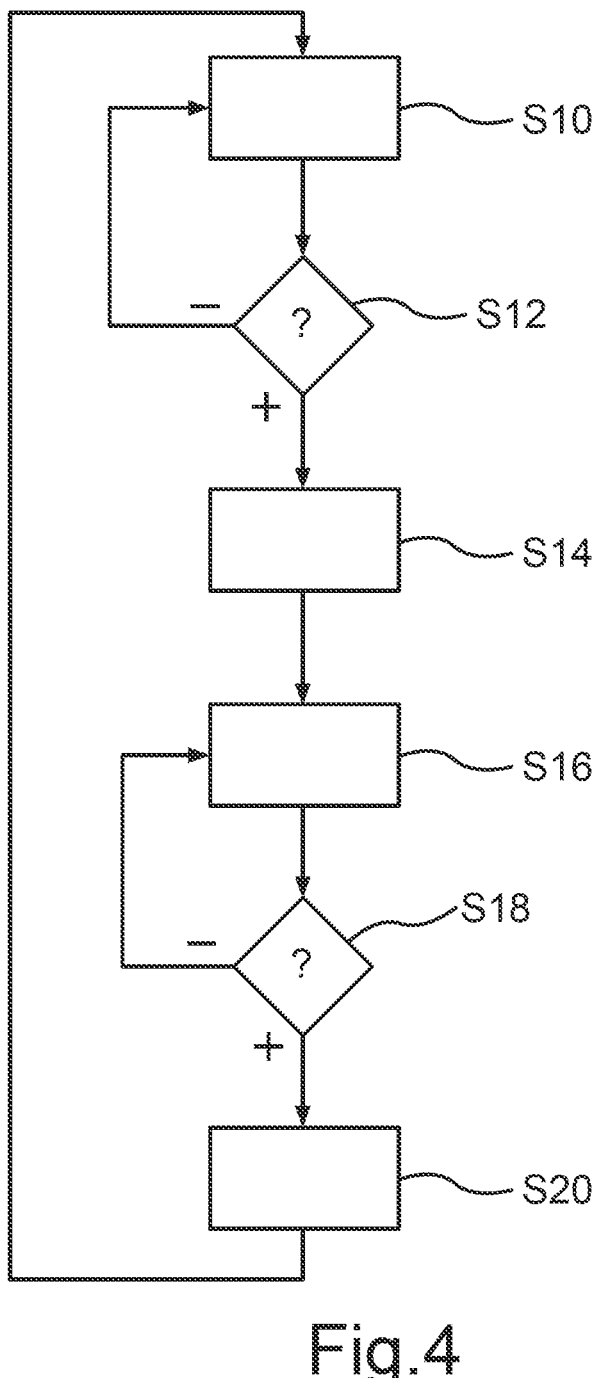
FIG. 4 shows a flow chart to illustrate a method for signaling the end of the charging according to another embodiment.

FIG. 4 shows a flow chart to illustrate a method for signaling an end of the charging according to one embodiment. The method starts in step S10, when a first motor vehicle 10 is being charged at a charging column 16. As described, during this charging process, the output devices 24a, 24b put out various information about the current charging process. For example, they may also only signal that a charging process is currently in progress and that the charging column 16 is therefore occupied. Optionally, no signal at all will be put out by the output devices 24a, 24b at this time.

In the next step S12, a check is made for the fulfillment of a charging criterion which defines an end of the charging. Thus, for example, the charging criterion may be that the energy accumulator 14 has already been charged fully or up to a predetermined charging status. Alternatively or additionally, such a criterion may also contain a predetermined maximum charging duration or a maximum monetary amount for which the charging should be done. Various other criteria are also conceivable. If the end of the charging has not yet been reached according to one such criterion, the method moves on to step S10 and the motor vehicle 10 or its energy accumulator 14 is charged further, especially until finally in step S12 the end of the charging is detected according to the predetermined criterion.

Thus, when the end of the charging is detected, first of all the locking between the charging plug and the motor vehicle 10 is released in step S14. At the same time, or following this, in step S16 the signal output by the output devices 24a, 24b is initiated, telling the second user 22 that the charging is ended and that they can now pull out the charging plug from the first motor vehicle 10 and use it for charging their own motor vehicle 20.

In step S18 a check is then made to determine whether the charging cable 18 is still connected to the first motor vehicle 10 or whether the charging cable 18 has now been coupled once more with another motor vehicle, such as the second motor vehicle 20. If this is not so, the method moves on again to step S16 and the outputting of the signal by the output devices 24a, 24b continues to be maintained. In other words, the end of the charging is reported by the output devices 24a, 24b and the availability of the charging cable 18 is reported by these output devices 24a, 24b until such time as is finally determined, in step S18, that the charging cable 18 has been separated from the motor vehicle 10 or has been coupled with another motor vehicle 20.

The method then moves on to step S20, in which the signal outputting by the output devices 24a, 24b is ended. After this, the method starts all over again in step S10, when the second motor vehicle 20 is now being charged via the charging column 16.

It should further be noted that it is also possible for only the motor vehicle 10 or also only the charging column 16 to have a corresponding output device 24a, 24b. Neither is it necessarily required that the two output devices 24a, 24b end their outputting of the signal at the same time. For example, it may be provided that first of all the motor vehicle 10 will halt the signal output through its output device 24a as soon as it is detected that the charging cable 18 has been separated from the motor vehicle 10. On the other hand, the output device 24b of the charging column 16 may continue with the signal outputting until it detects a new coupling of the charging cable 18 with another motor vehicle 20. Alternatively, however, the signal outputting by the output device 24b of the charging column 16 can also be ended with the detection of the uncoupling of the charging cable 18 from the first motor vehicle 10. By the ending of the signal outputting is meant here the signal which reports the end of the charging. Of course, the output devices 24a, 24b can also once more continue to show during a new charging process the status information for this charging process or put out a signal reporting the occupancy of the charging column 16.

In summary, it should be pointed out that it is thus possible to provide a function by which the end of the charging process becomes evident to third parties in the immediate vicinity of a vehicle and new charging customers are told that the charging cable is once more available. As described, such a communication of the end of the charging to third parties can be implemented in various ways, namely, by only one message at the vehicle, by only one message at the charging column, or by both a message at the vehicle and a message at the charging column. In other words, therefore, it is possible to avoid needlessly long passive waiting times at public charging columns, and a display device may now be provided which indicates the end of the charging process to third parties or to charging customers. As described, this display device can be mounted on the vehicle, installed at the charging column, or be present on both the vehicle and the charging column. In the form of a display device, such as a display, a lamp, or another indicator feature, it is possible to communicate the current charge status, for example, the end of the charging process, and the implications of this to outsiders. During the charging process, it can be communicated that the vehicle is being charged, or the duration of the charging process, and after the ending of the charging process it can be communicated that the charging has ended and that the charging plug can be removed. Optionally, this may also be possible only if an automatic unlocking of the charging plug after the end of the charging process has been released or authorized by the first user even prior to the charging process. With the removal of the charging cable from the vehicle, the charging process is ended at once, that is, also the processes related to the charging, especially the communication between charging column and motor vehicle, and also in particular the use of personalized data of the user of the charged motor vehicle. In other words, the personalized data necessary for the charging process is blocked not later than the removal of the charging cable, so that no further access is possible to data of the user, in order to prevent its misuse. Thus, some embodiments can assure an optimal occupancy of public charging columns in a secure manner. Besides assuring an optimal utilization and occupancy of the charging column, unnecessary prices and costs are moreover avoided for the end customers, as well as slack time for the operators of the charging columns.

On the whole, the examples show how the embodiments can provide a function for communication of the end of the charging to third parties by signaling the end of the charging, making possible an enormous decrease in the waiting times at charging columns and making the utilization of such charging columns much more efficient.

German patent application no. 10 2020 125495.4, filed Sep. 30, 2020, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for signaling an end of charging of a charging process that charges an energy accumulator of a first motor vehicle, which is associated with a first user, at a charging device external to the first motor vehicle, the method comprising:

detecting an end of a charging of the energy accumulator of the first motor vehicle connected by a coupling between the first motor vehicle and the charging device during the charging;

determining whether separating of the coupling between the first motor vehicle and the charging device has been authorized by the first user; and signaling the end of the charging at least under a condition that the end of the charging has been detected, wherein the signaling includes the end of the charging being signaled to at least one second user, different from the first user, regardless of whether separating of the coupling of the first motor vehicle to the charging device has been authorized by the first user after the detecting of the end of the charging, wherein the coupling between the first motor vehicle and the charging device is locked during the charging process, wherein the coupling is automatically unlocked after detecting the end of the charging, by performing an automatic unlocking of a charging plug of the charging device inserted at the first motor vehicle after detecting the end of the charging, wherein the signaling includes displaying information regarding the end of the charging on a display device of the first motor vehicle arranged on an exterior of the first motor vehicle in an area of a charging socket of the first motor vehicle, and wherein, if separating of the coupling between the first motor vehicle and the charging device is determined to have been authorized by the first user, the information regarding the end of the charging includes text indicating that pulling out of the charging plug of the charging device from the charging socket of the first motor vehicle is permitted, and wherein, if separating of the coupling between the first motor vehicle and the charging device is not determined to have been authorized by the first user, the information regarding the end of the charging does not include the text indicating that pulling out of the charging plug of the charging device from the charging socket of the first motor vehicle is permitted.

2. The method according to claim 1, wherein the signaling includes a public outputting of information regarding the end of the charging until a coupling between the charging device and a second motor vehicle is detected.

3. The method according to claim 1, wherein an optical and/or acoustical output is given when signaling information regarding the end of the charging by an output device, including a device of the first motor vehicle and/or a device of the charging device.

4. The method according to claim 1, wherein the signaling includes a continual outputting of information regarding the end of the charging, and the outputting of the information regarding the end of the charging is terminated as soon as a separation of the coupling between the charging device and the first motor vehicle is detected and/or as soon as a coupling between the charging device and a second motor vehicle is detected.

5. The method according to claim 1, wherein the signaling includes a sending of a second piece of information regarding the end of the charging to a central data processing device that forwards the second piece of information regarding the end of the charging to at least one terminal device of a third user.

6. The method according to claim 1, further comprising:
determining whether authorization is received from the first user to automatically unlock the coupling to the charging device after the end of the charging of the energy accumulator of the first motor vehicle is detected, prior to a beginning of the charging of the energy accumulator of the first motor vehicle, wherein the coupling is automatically unlocked after detecting the end of the charging, in response to determining that authorization is received from the first user to automatically unlock the coupling to the charging device after the end of the charging of the energy accumulator of the first motor vehicle is detected, prior to the beginning of the charging of the energy accumulator of the first motor vehicle, and wherein the coupling is not automatically unlocked after detecting the end of the charging, in response to determining that authorization is not received from the first user to automatically unlock the coupling to the charging device after the end of the charging of the energy accumulator of the first motor vehicle is detected, prior to the beginning of the charging of the energy accumulator of the first motor vehicle.

7. The method according to claim 6, further comprising:
displaying a menu including a setting that is selectable to indicate that the first user consents to authorize automatic unlocking of the coupling to the charging device after the end of the charging of the energy accumulator of the first motor vehicle is detected, prior to the beginning of the charging of the energy accumulator of the first motor vehicle, wherein the authorization from the first user to automatically unlock the coupling to the charging device after the end of the charging of the energy accumulator of the first motor vehicle is detected is received in response to selection of the setting.

8. An output device for signaling an end of charging of an energy accumulator of a first motor vehicle, which is associated with a first user, at a charging device, the output device comprising:
a processor; and
a memory storing program code that, when executed by the processor, causes the output device to:
determine whether separating of a coupling between the first motor vehicle and the charging device has been authorized by the first user; and
signal the end of the charging based on a detected end of the charging of the energy accumulator, wherein the output device, in operation, signals the end of the charging to at least one second user, different from the first user, regardless of whether separation of the coupling between the first motor vehicle and the charging device has been authorized by the first user, after a detection of the end of the charging, wherein the coupling between the first motor vehicle and the charging device is locked during a charging process, wherein the coupling is automatically unlocked after detecting the end of the charging, by performing an automatic unlocking of a charging plug of the charging device inserted at the first motor vehicle after detecting the end of the charging, wherein the end of the charging is signaled by displaying information regarding the end of the charging on a display device of the first motor vehicle arranged on an exterior of the first motor vehicle in an area of a charging socket of the first motor vehicle, wherein, if separating of the coupling between the first motor vehicle and the charging device is determined to have been authorized by the first user, the information regarding the end of the charging includes text indicating that pulling out of the charging plug of the charging device from the charging socket of the first motor vehicle is permitted, and wherein, if separating of the coupling between the first motor vehicle and the charging device is not determined to have been authorized by the first user, the information regarding the end of the charging does not include the text indicating that pulling out of the charging plug of the charging device from the charging socket of the first motor vehicle is permitted.

9. The output device according to claim 8, wherein the program code, when executed by the processor, causes the output device to determine whether authorization is received from the first user to automatically unlock the coupling to the charging device after the end of the charging of the energy accumulator of the first motor vehicle is detected, prior to a beginning of a charging of the energy accumulator of the first motor vehicle, wherein the coupling is automatically unlocked after detecting the end of the charging, in response to determining that authorization is received from the first user to automatically unlock the coupling to the charging device after the end of the charging of the energy accumulator of the first motor vehicle is detected, prior to the beginning of the charging of the energy accumulator of the first motor vehicle, and wherein the coupling is not automatically unlocked after detecting the end of the charging, in response to determining that authorization is not received from the first user to automatically unlock the coupling to the charging device after the end of the charging of the energy accumulator of the first motor vehicle is detected, prior to the beginning of the charging of the energy accumulator of the first motor vehicle.

10. The output device according to claim 9, wherein the program code, when executed by the processor, causes the output device to receive the authorization from the first user to automatically unlock the coupling to the charging device after the end of the charging of the energy accumulator of the first motor vehicle is detected in response to selection of a setting in a displayed menu that is selectable to indicate that the first user consents to authorize automatic unlocking of the coupling to the charging device after the end of the charging of the energy accumulator of the first motor vehicle is detected, prior to the beginning of the charging of the energy accumulator of the first motor vehicle.

11. A motor vehicle, comprising:
an output device that includes:
a processor; and
a memory storing program code that, when executed by the processor, causes the output device to:
determine whether separating of a coupling between the motor vehicle and a charging device has been authorized by a first user; and
signal an end of a charging of an energy accumulator of the motor vehicle, which is associated with the first user, at the charging device,
wherein the output device, in operation, signals the end of the charging based on a detected end of the charging of the energy accumulator;
wherein the output device, in operation, signals the end of the charging to at least one second user, different from the first user, regardless of whether separation of the coupling between the motor vehicle and the charging device has been authorized by the first user, after a detection of the end of the charging,
wherein the coupling between the motor vehicle and the charging device is locked during a charging process,
wherein the coupling is automatically unlocked after detecting the end of the charging, by performing an automatic unlocking of a charging plug of the charging device inserted at the motor vehicle after detecting the end of the charging,
wherein the end of the charging is signaled by displaying information regarding the end of the charging on a display device of the motor vehicle arranged on an exterior of the motor vehicle in an area of a charging socket of the motor vehicle, wherein, if separating of the coupling between the motor vehicle and the charging device is determined to have been authorized by the first user, the information regarding the end of the charging includes text indicating that pulling out of the charging plug of the charging device from the charging socket of the motor vehicle is permitted, and wherein, if separating of the coupling between the motor vehicle and the charging device is not determined to have been authorized by the first user, the information regarding the end of the charging does not include the text indicating that pulling out of the charging plug of the charging device from the charging socket of the motor vehicle is permitted.

12. The motor vehicle according to claim 11, wherein the program code, when executed by the processor, causes the output device to determine whether authorization is received from first user to automatically unlock the coupling to the charging device after the end of the charging of the energy accumulator of the motor vehicle is detected, prior to a beginning of a charging of the energy accumulator of the motor vehicle, wherein the coupling is automatically unlocked after detecting the end of the charging, in response to determining that authorization is received from first user to automatically unlock the coupling to the charging device after the end of the charging of the energy accumulator of the motor vehicle is detected, prior to the beginning of the charging of the energy accumulator of the motor vehicle, and wherein the coupling is not automatically unlocked after detecting the end of the charging, in response to determining that authorization is not received from first user to automatically unlock the coupling to the charging device after the end of the charging of the energy accumulator of the motor vehicle is detected, prior to the beginning of the charging of the energy accumulator of the motor vehicle.

13. The motor vehicle according to claim 12, wherein the program code, when executed by the processor, causes the output device to receive the authorization from the first user to automatically unlock the coupling to the charging device after the end of the charging of the energy accumulator of the motor vehicle is detected in response to selection of a setting in a displayed menu that is selectable to indicate that the first user consents to authorize automatic unlocking of the coupling to the charging device after the end of the charging of the energy accumulator of the motor vehicle is detected, prior to the beginning of the charging of the energy accumulator of the motor vehicle.

14. A charging device including a charging column, the charging device comprising:
an output device that includes:
a processor; and
a memory storing program code that, when executed by the processor, causes the output device to:
determine whether separating of a coupling between a motor vehicle and the charging device has been authorized by a first user; and
signal an end of a charging of an energy accumulator of a motor vehicle, which is associated with the first user, at the charging device,
wherein the output device, in operation, signals the end of the charging based on a detected end of the charging of the energy accumulator,
wherein the output device is configured to signal the end of the charging to at least one second user, different from the first user, regardless of whether separation of the coupling between the motor vehicle and the charging device has been authorized by the first user, after a detection of the end of the charging, wherein the coupling between the motor vehicle and the charging device is locked during a charging process, wherein the coupling is automatically unlocked after detecting the end of the charging, by performing an automatic unlocking of a charging plug of the charging device inserted at the motor vehicle after detecting the end of the charging, wherein the end of the charging is signaled by displaying information regarding the end of the charging on a display device of the motor vehicle arranged on an exterior of the motor vehicle in an area of a charging socket of the motor vehicle, wherein, if separating of the coupling between the motor vehicle and the charging device is determined to have been authorized by the first user, the information regarding the end of the charging includes text indicating that pulling out of the charging plug of the charging device from the charging socket of the motor vehicle is permitted, and wherein, if separating of the coupling between the motor vehicle and the charging device is not determined to have been authorized by the first user, the information regarding the end of the charging does not include the text indicating that pulling out of the charging plug of the charging device from the charging socket of the motor vehicle is permitted.

15. The charging device according to claim 14, wherein the program code, when executed by the processor, causes the output device to determine whether authorization is received from the first user to automatically unlock the coupling to the charging device after the end of the charging of the energy accumulator of the motor vehicle is detected, prior to a beginning of a charging of the energy accumulator of the motor vehicle, wherein the coupling is automatically unlocked after detecting the end of the charging, in response to determining that authorization is received from the first user to automatically unlock the coupling to the charging device after the end of the charging of the energy accumulator of the motor vehicle is detected, prior to the beginning of the charging of the energy accumulator of the motor vehicle, and wherein the coupling is not automatically unlocked after detecting the end of the charging, in response to determining that authorization is not received from the first user to automatically unlock the coupling to the charging device after the end of the charging of the energy accumulator of the motor vehicle is detected, prior to the beginning of the charging of the energy accumulator of the motor vehicle.

16. The charging device according to claim 15, wherein the program code, when executed by the processor, causes the output device to receive the authorization from the first user to automatically unlock the coupling to the charging device after the end of the charging of the energy accumulator of the motor vehicle is detected in response to selection of a setting in a displayed menu that is selectable to indicate that the first user consents to authorize automatic unlocking of the coupling to the charging device after the end of the charging of the energy accumulator of the motor vehicle is detected, prior to the beginning of the charging of the energy accumulator of the motor vehicle.

* * * * *